May 1, 1934.  F. MITTEAU  1,956,926
PROCESS FOR THE SIMULTANEOUS MANUFACTURE OF AMMONIUM
PHOSPHATE AND OF OTHER FERTILIZING SUBSTANCES
Filed Aug. 21, 1930
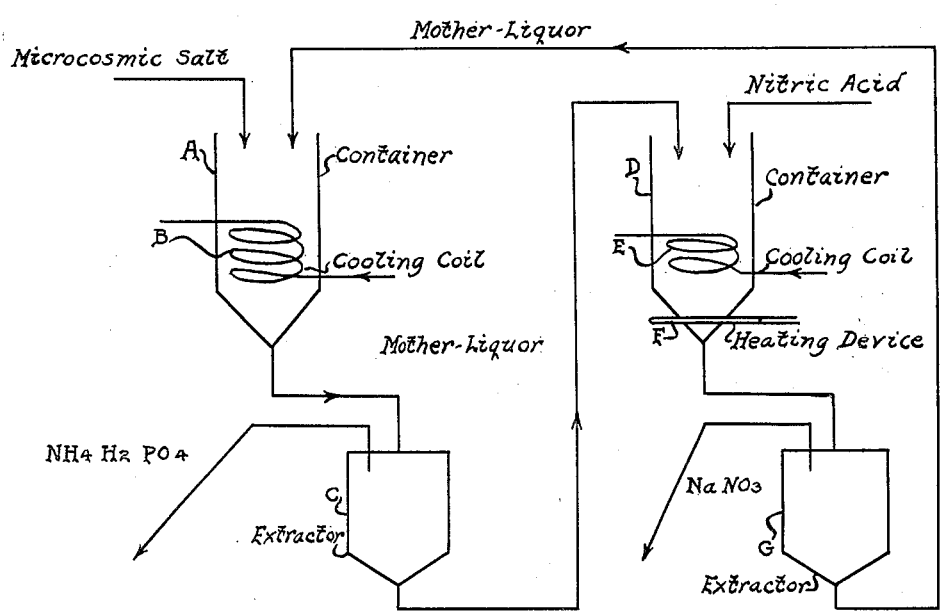
Inventor
Ferdinand Mitteau,
By Emil Bönnelycke
Attorney Patented May 1, 1934

1,956,926

UNITED STATES PATENT OFFICE 1,956,926

PROCESS FOR THE SIMULTANEOUS MANUFACTURE OF AMMONIUM PHOSPHATE AND OF OTHER FERTILIZING SUBSTANCES

Ferdinand Mitteau, Villemombles, France, assignor to Société d'Etudes Scientifiques et d'Entreprises Industrielles, Paris, France, a corporation of France Application August 21, 1930, Serial No. 476,942
In Germany August 27, 1929

3 Claims. (Cl. 23—107)

It is known that in certain processes for the treatment of sodium salts, there is obtained ammonium-soda phosphate, i. e. microcosmic salt $PO_4NaNH_4H$.

This invention gives a method whereby this salt can be transformed into other fertilizing salts. The method consists essentially in dissolving the microcosmic salt in nitric acid of suitable concentration. An abundant crystallization of substantially pure mono-ammonium phosphate will take place within the liquor which, after the said mono-ammonium phosphate has crystallized out, contains chiefly sodium nitrate in the dissolved state, together with a certain percentage of mono-ammonium phosphate remaining still in solution. Therefore, there is obtained on one hand mono-ammonium phosphate and on the other hand a solution from which it will be possible to derive either a fertilizer consisting primarily of sodium nitrate by causing a bulk crystallization to take place, or substantially pure sodium nitrate by an addition to the solution of substance promoting the crystallization or precipitation of sodium nitrate, e. g. a substance which already contains the $NO_3$ or the Na ion.

Specifically, it will be possible to operate in a cycle as described hereinafter.

1. To the mother-liquors remaining from the separation of sodium nitrate effected in a prior series of operation there is added solid dry or wet microcosmic salt such for instance as that which has just been obtained by the action of phosphoric acid and ammonia upon a solution of sodium chloride, after which the mixture is slightly heated to cause the salt to dissolve. By then allowing the solution to cool e. g. down to room temperature, i. e. in most practical cases to 15° C., a plentiful deposit of crystals will be obtained which are to be washed as carefully as possible in order to drive away such mother liquor as may happen to impregnate them. The crystals consist almost only of mono-ammonium phosphate which may easily be transformed thereafter into diammonium phosphate by the action of ammonia.

2. The mother-liquors left after such monoammonium phosphate are then concentrated so as to evaporate an amount of water equal to that just introduced with the microcosmic salt as water of crystallization and eventually as water impregnating the crystals, plus that which is to be introduced in the form of nitric acid. The mother-liquors thus concentrated are allowed to cool, whereafter nitric acid is added thereto in the proportion of one mole of acid to each mole of microcosmic salt introduced in the above described first step on the process.

By then cooling the liquor to as low a temperature as possible, e. g. down to 0° C., the crystals of nearly pure sodium nitrate are separated out in amounts which are the greater the lower cooling temperature has been used.

The mother-liquors which remain after the separation of the sodium nitrate are the mother-liquors above referred to which are taken again in a cycle and undergo once more the same two successive operations as described hereinabove.

In the procedure as described, the concentration step intended to evaporate the water introduced in the form of nitric acid and microcosmic salt takes place after the microcosmic salt has been separated and before the nitric acid is added. This step however could be arranged somewhere else in the cycle of operations and particularly follow the separation of the sodium nitrate. Moreover it could be carried out at more than one time.

By way of example there are given here below the results of one cycle of operations.

1st step

Mother-liquors_____ 1900 litres
Wet microcosmic added_____ 2000 kilograms

After cooling down to 25° C. there will be separated:

Mono-ammonium phosphate_____ 1500 kilograms
Containing $\begin{cases} P_2O_5 \text{_____} & 59,0 \\ \text{Ammoniacal N \_\_\_\_\_} & 11,8 \\ \text{Nitric N _____} & 0,5 \end{cases}$

2nd step

| | Litres |
|---|---|
| Mother-liquors from the above step | 2600 |
| Volume after concentration | 1700 |
| 40° Bé. nitric acid added | 750 |

By cooling down to 15° C. there will be separated

Nitrate of sodium_____kgs__ 830
Containing $\begin{cases} P_2O_5 \text{_____percent\_\_} & 1,6 \\ \text{Nitric N _____percent\_\_} & 14,8 \end{cases}$ Merely by causing the product to crystallize in water, pure sodium nitrate can be obtained.

The above example is given only for illustrative purposes as the amounts of the substance employed may be varied to some extent as well as the temperatures down to which the solutions are cooled.

Mono-ammonium phosphate as obtained by the process according to this invention may be used as a source of phosphoric acid and ammonia in the production of microcosmic salt from sodium salts, to which reference has been made at the beginning of this specification. In particular it may be taken as a starting material in the processes which consists in producing microcosmic salt and ammonium chloride from sodium chloride and ammonium phosphate. The microcosmic salt which is used as a starting material in the process according to this invention will thus be regenerated, and sodium nitrate and ammonium chloride will finally be obtained from sodium chloride, ammonia and nitric acid through microcosmic salt. Should the microcosmic salt be produced, as described elsewhere, instead from sodium chloride, from such a mineral as sylvinite which contains both sodium chloride and potassium chloride, there would be obtained instead of ammonium chloride a mixture of potassium chloride and ammonium chloride ("potazote").

Nitric acid might also be added to the mono-ammonium phosphate obtained by the process according to this invention and which is used as a source of phosphoric acid and ammonia in the production of microcosmic salt from sodium chloride or such a mineral as sylvinite. By neutralizing the acid solution by an addition of ammonia, a solution would then be formed which in addition to ammonium chloride or a mixture of ammonium chloride and potassium chloride, would also contain ammonium nitrate. Therefore, starting from sodium chloride, nitric acid and ammonia, there would be obtained on one hand nitrate of soda and on the other hand a mixture of ammonium chloride and nitrate; starting from sylvinite, nitric acid and ammonia, there would be obtained on one hand nitrate of soda and on the other hand (as a result of the double decomposition taking place between the ammonium nitrate and the potassium chloride in the solution) a fertilizer consisting of a mixture of ammonium chloride and potassium nitrate, eventually together with ammonium nitrate or potassium chloride depending on the proportion of the substances introduced in the process.

The process is schematically illustrated by the accompanying drawing.

As shown in the single figure of this drawing, the microcosmic salt is added to the container A which includes a coil B carrying cooling water. The mono-ammonium phosphate which crystallizes in the container A is separated from the mother liquors in the extractor C. The mother liquors coming from the extractor C are introduced into the container D which includes a coil E containing cooling water or liquid ammonia. The container D also includes a heating device F. The sodium nitrate which crystallizes in the container D is separated from the mother liquors of crystallization in the extractor G. The mother liquors coming from the extractor G are again introduced into the container A, and the process is repeated.

I claim:

1. A process of alternately separating mono-ammonium phosphate and sodium nitrate from a liquor circulating in a closed cycle, which comprises dissolving microcosmic salt in mother liquor resulting from a previous cycle of operation and containing sodium nitrate and free nitric acids, cooling the mother liquor, removing the separated mono-ammonium phosphate, concentrating the mother liquor, treating the mother liquor with nitric acid, cooling the mother liquor, removing the separated sodium nitrate, and again subjecting the mother liquor, which contains sodium nitrate and free nitric acid, to the same succession of steps.

2. A process of alternately separating mono-ammonium phosphate and sodium nitrate from a liquor circulating in a closed cycle, which comprises dissolving microcosmic salt in mother liquor resulting from a previous cycle of operation and containing sodium nitrate and free nitric acids cooling the mother liquor, removing the separated mono-ammonium phosphate, treating the mother liquor with nitric acid, cooling the mother liquor, removing the separated sodium nitrate, concentrating the mother liquor, and again subjecting the mother liquor, which contains sodium nitrate and free nitric acid, to the same succession of steps.

3. A process of manufacturing mono-ammonium phosphate and sodium nitrate, comprising dissolving microcosmic salt in a solution containing nitric acid in a dissolution zone, cooling the solution containing the microcosmic salt while in the dissolution zone, passing the cooled solution to an extracting zone, separating mono-ammonium phosphate from the solution and passing the solution to a crystallizing zone, introducing nitric acid into the solution contained therein to effect crystallization of sodium nitrate, removing the mass from the crystallizing zone, separating the crystals of sodium nitrate and passing the mother liquor to the dissolution zone as a solvent for the microcosmic salt.

FERDINAND MITTEAU.